UNITED STATES PATENT OFFICE 2,490,753

2-TRIFLUOROMETHYL-1,3-BUTADIENE

Hubert M. Hill and Edmund B. Towne, Rochester, N. Y., assignors to Eastman Kodak Company, Rochester, N. Y., a corporation of New Jersey No Drawing. Application October 15, 1948, Serial No. 54,815

9 Claims. (Cl. 260—653)

This invention relates to 2-trifluoromethyl-1,3-butadiene, having the structural formula:

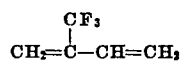

and a method for preparing the same.

It is known that 2-fluoro-1,3-butadiene can be polymerized to give polymers having good tensile strength, high softening point, good sunlight resistance and good oil resistance.

We have now found that 2-trifluoromethyl-1,3-butadiene polymerizes readily in emulsion to yield rubber-like homopolymers which are superior in properties to poly-1,3-butadiene. It also copolymerizes with many monomers, such as vinyl acetate, vinyl chloride, vinylidene chloride, 1,1-dichloro-2,2-difluoroethylene, trifluorovinyl chloride, ethyl acrylate, methyl methacrylate, acrylonitrile, ethyl methacrylate, styrene, dichlorostyrene, etc. When the interpolymers formed with styrene or acrylonitrile were compared with Buna S (copolymer of butadiene and styrene) and Buna N (copolymer of butadiene and acrylonitrile), it was found that interpolymers of 2-trifluoromethyl-1,3-butadiene and styrene or acrylonitrile exhibited the greater tensile strength and oil resistance characteristics. The simple homopolymers and interpolymers of 2-trifluoromethyl-1,3-butadiene as compared with 2-methyl-1,3-butadiene have appreciably higher softening points and are much more difficult to burn. These trifluoromethyl homo and interpolymers are thermally stable at temperatures up to 400–500° C. 2-trifluoromethyl-1,3-butadiene undergoes a Diels-Alder reaction with compounds such as maleic anhydride, furan, cyclopentadiene, etc. The resulting compounds are valuable intermediates in the preparation of polymers, dyes, drugs, etc.

It is an object of our invention to provide 2-trifluoromethyl-1,3-butadiene which gives improved homo and interpolymers with regard to thermal stability, sun and oil resistance, high softening points, and tensile strength. A further object is to provide a process for preparing 2-trifluoromethyl-1,3-butadiene. Other objects will become apparent hereinafter.

In accordance with our invention, 2-trifluoromethyl-1,3-butadiene is prepared by reacting 1,1,1-trifluoroacetone (Swarts, Bull. Sci. Acad. Roy. Belg., 1927, 179) with an ethynyl magnesium halide, in the presence of diethyl ether to form an acetylenic alcohol, dehydrating the acetylenic alcohol, thus formed, to an olefinic compound containing a triple bond, and partially hydrogenating the triple bond, thus formed. The acetylenic alcohol formed has the following formula:

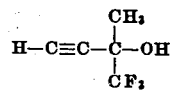

Upon dehydration, this alcohol gives α-trifluoromethylvinylacetylene:

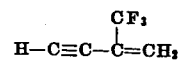

which upon partial hydrogenation of the acetylenic bond gives 2-trifluoromethyl-1,3-butadiene. The dehydration is advantageously effected in the presence of a dehydrating agent, e. g. oxalic acid, sulfuric acid, sodium bisulfate, succinic anhydride, etc. The hydrogenation of the acetylenic compound is advantageously effected in the presence of a metallic hydrogenation catalyst, e. g. palladium black, nickel, etc.

Alternatively, 2-trifluoromethyl-1,3-butadiene can be prepared by reacting 1,1,1-trifluoroacetone with an ethynyl magnesium halide, in the presence of diethyl ether to form an acetylenic alcohol having the formula:

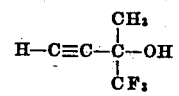

partially hydrogenating the acetylenic alcohol, thus formed, to 3-trifluoromethyl-1-buten-3-ol having the formula:

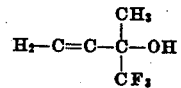

and dehydrating the 3-trifluoromethyl-1-buten-3-ol with a dehydrating agent, e.g. oxalic acid, sulfuric acid, sodium bisulfate, succinic anhydride, etc. The hydrogenation of the acetylenic compound is advantageously effected in the presence of a metallic hydrogenation catalyst, e.g. palladium black, nickel, etc.

The following examples will serve to illustrate further the process of preparing 2-trifluoromethyl-1,3-butadiene.

Example 1

One hundred twelve grams of 1,1,1-trifluoroacetone (Swarts, Bull. Sci. Acad. Roy. Belg., 1927, 179) were added dropwise to one mole of enthynyl magnesium bromide in 250 ml. of ether and refluxed for one hour after the addition was completed. The reaction mixture was poured over 200 grams of ice and 100 ml. of concentrated hydrochloric acid. The ether layer was separated and dried with anhydrous calcium sulfate. The ether was removed by fractionation. The residue was hydrogenated in the presence of palladium black at 23° C. and a hydrogen pressure of 50 pounds per square inch until 22 liters (S.T.P.) of hydrogen had been consumed. The catalyst was removed by filtration and the filtrate was refluxed with 50 grams of anhydrous oxalic acid for two hours. The liquid product was recovered by steam distillation and dried with anhydrous calcium sulfate. Rectification yielded 58.5 grams of 2-trifluoromethyl-1,3-butadiene boiling at 40–41° C. and having a vapor density of 6.903 grams per liter at 75° C. and 752 mm. of mercury pressure.

*Example 2*

A solution of 112 grams of 1,1,1-trifluoroacetone in 100 ml. of ether was added dropwise to a solution of one mole of ethynyl magnesium bromide in 200 ml. of ether. When the addition was completed, the reaction mixture was poured into 200 grams of ice and 100 ml. of concentrated hydrochloric acid. The ether layer was separated and dried with anhydrous calcium sulfate. The ether was removed by fractionation and the residue was hydrogenated in the presence of palladium black and a hydrogen pressure of 50 pounds per square inch until the hydrogen uptake slowed noticeably. The catalyst was separated from the reaction mixture by filtration and the residue was refluxed with 40 grams of anhydrous magnesium sulfate for three hours. The reaction mixture was diluted with 200 ml. of water and the organic material was extracted with ether. The extract was dried with anhydrous calcium chloride and rectified, yielding 45 grams of 2-trifluoromethyl-1,3-butadiene boiling at 40–41° C.

*Example 3*

One hundred and twelve grams of 1,1,1-trifluoroacetone dissolved in 300 ml. of ether were added dropwise to one mole of ethynyl magnesium bromide in 250 ml. of ether and refluxed for 2 hours after the addition was completed. The reaction mixture was then hydrolyzed with iced dilute hydrochloric acid, and the ether layer was separated and dried over Drierite (anhydrous calcium sulfate). The ether was removed by fractionation and the residue was dehydrated by refluxing with 50 grams of oxalic acid for 2 hours. The reaction product,

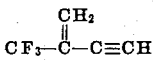

3-trifluoromethyl-butyn-1-ene-3, was obtained by careful steam distillation and rectification. This was reduced in an ether solution with palladium black at room temperature and 50 pounds hydrogen pressure until 1 mole of hydrogen had been taken up (reacted). The reaction product was filtered, dried, and rectified, yielding 55 grams of 2-trifluoromethyl-1,3-butadiene, boiling at 40–41° C. at 745 mm. of Hg pressure.

*Example 4*

2-trifluoromethyl-1,3-butadiene was prepared exactly as in Example 3, except that the dehydration was effected in the presence of magnesium sulfate instead of oxalic acid.

What we claim as our invention and desire to be secured by Letters Patent of the United States is:

1. A process for producing 2-trifluoromethyl-1,3-butadiene comprising dehydrating 3-trifluoromethyl-1-buten-3-ol, in the presence of a dehydrating agent.

2. A process for producing 2-trifluoromethyl-1,3-butadiene comprising dehydrating 3-trifluoromethyl-1-buten-3-ol, in the presence of oxalic acid as a dehydrating agent.

3. A process for producing 2-trifluoromethyl-1,3-butadiene comprising dehydrating 3-trifluoromethyl-1-buten-3-ol, in the presence of sulfuric acid as a dehydrating agent.

4. A process for producing 2-trifluoromethyl-1,3-butadiene comprising dehydrating 3-trifluoromethyl-1-buten-3-ol, in the presence of succinic anhydride as a dehydrating agent.

5. A process for producing 2-trifluoromethyl-1,3-butadiene comprising reacting 1,1,1-trifluoroacetone with ethynylmagnesium bromide, in the presence of diethyl ether, to form an acetylenic alcohol, represented by the formula,

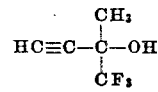

partially hydrogenating the acetylenic alcohol, thus formed, to produce 3-trifluoromethyl-1-buten-3-ol, represented by the formula

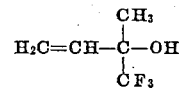

and dehydrating the 3-trifluoromethyl-1-buten-3-ol in the presence of a dehydration agent to produce 2-trifluoromethyl-1,3-butadiene.

6. A process according to claim 5, wherein the dehydration agent used to dehydrate the 3-trifluoromethyl-1-buten-3-ol is oxalic acid.

7. A process according to claim 4, wherein the dehydration agent used to dehydrate the 3-trifluoromethyl-1-buten-3-ol is sulfuric acid.

8. A process according to claim 4, wherein the dehydration agent used to dehydrate the 3-trifluoromethyl-1-buten-3-ol is succinic anhydride.

9. 2-trifluoromethyl-1,3-butadiene.

HUBERT M. HILL.
EDMUND B. TOWNE.

REFERENCES CITED

The following references are of record in the file of this patent:

FOREIGN PATENTS

| Number | Country | Date |
| --- | --- | --- |
| 737,276 | Germany | July 9, 1943 |

OTHER REFERENCES

Swarts: Chem. Abs., vol. 21, 2658 (1927).